No. 671,846. Patented Apr. 9, 1901.
L. P. WHITAKER.
APPARATUS FOR SEPARATING LATERAL PORTIONS OF LEAVES FROM THEIR STEMS.
(Application filed Jan. 15, 1901.)
(No Model.) 3 Sheets—Sheet 1.
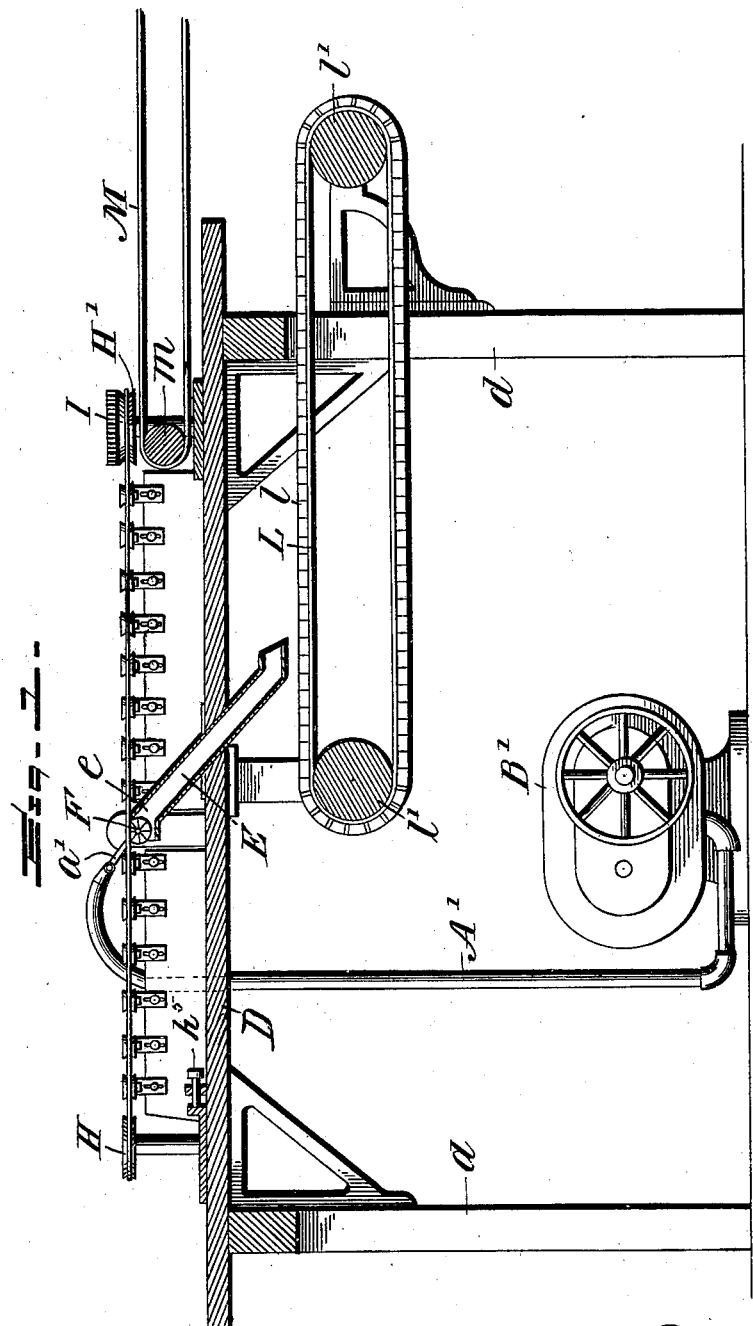
WITNESSES:
INVENTOR
Louis P. Whitaker
BY Whitaker & Prevost Attorneys No. 671,846. Patented Apr. 9, 1901.
L. P. WHITAKER.
APPARATUS FOR SEPARATING LATERAL PORTIONS OF LEAVES FROM THEIR STEMS.
(Application filed Jan. 15, 1901.)
(No Model.) 3 Sheets—Sheet 2.
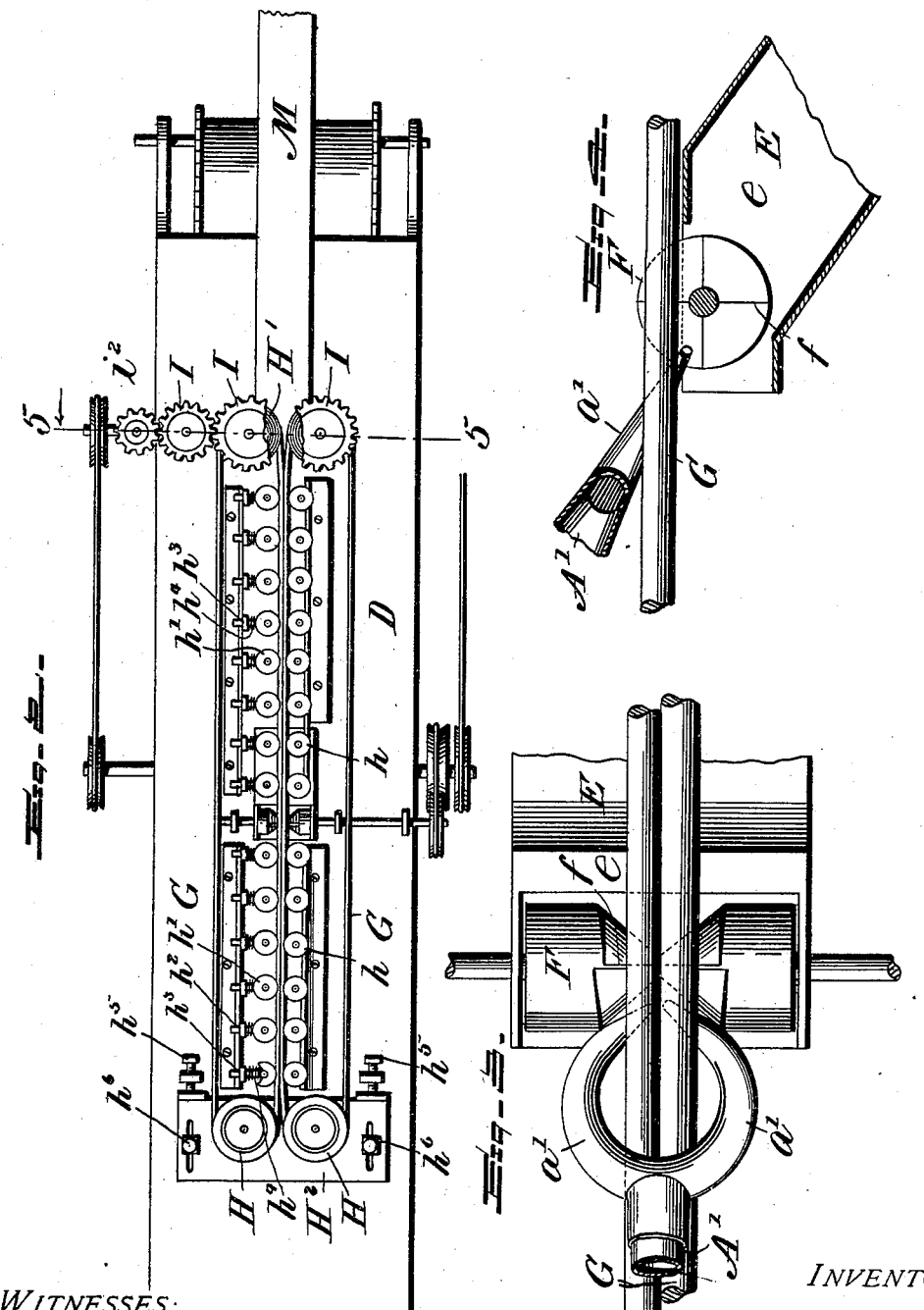
WITNESSES:
INVENTOR
Louis P. Whitaker
BY Whitaker & Prevost Attorneys.

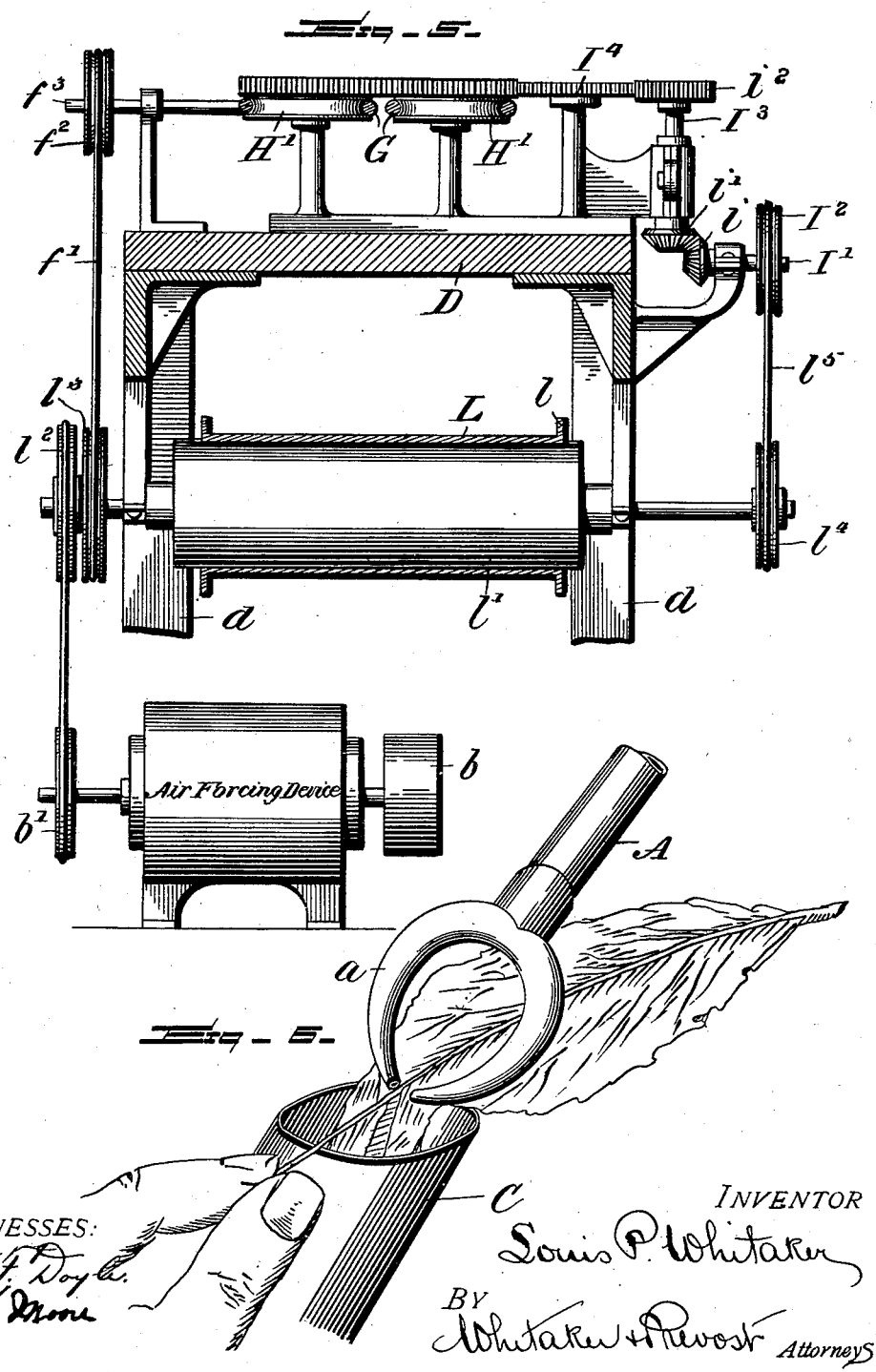

UNITED STATES PATENT OFFICE.

LOUIS P. WHITAKER, OF WASHINGTON, DISTRICT OF COLUMBIA, ASSIGNOR TO THE PNEUMATIC TOBACCO STEMMER CO., OF SAME PLACE.

APPARATUS FOR SEPARATING LATERAL PORTIONS OF LEAVES FROM THEIR STEMS.

SPECIFICATION forming part of Letters Patent No. 671,846, dated April 9, 1901.

Original application filed January 17, 1900, Serial No. 1,779. Divided and this application filed January 15, 1901. Serial No. 43,391. (No model.)

*To all whom it may concern:*

Be it known that I, LOUIS P. WHITAKER, a citizen of the United States, residing at Washington, in the District of Columbia, have invented certain new and useful Improvements in Apparatus for Separating the Lateral Portions of Leaves from Their Stems; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate one form of apparatus for carrying my invention into effect, the said invention being fully disclosed in the following description and claims.

This application is a division of my former application filed January 17, 1900, and given Serial No. 1,779.

Referring to the said drawings, Figure 1 represents a longitudinal sectional view of an apparatus for carrying my invention into effect. Fig. 2 is a top plan view of the same with the air-blast nozzles removed. Fig. 3 is an enlarged top plan view of a portion of the carrier, the rotary knife, and air-blast nozzles. Fig. 4 represents a vertical longitudinal section of the parts shown in Fig. 3. Fig. 5 is a transverse vertical section of Fig. 2 on line 5 5. Fig. 6 is a detail view of another form of apparatus for carrying out my process.

The object of my invention is to remove or separate the stems of tobacco and similar leaves from the lateral portions of the leaves; and it consists in the apparatus hereinafter described, in which the stem is seized and held while the lateral portions of the leaves are subjected to the action of a current of air in the form of an air-blast and are torn or stripped from the stem. In order to secure a clean and uniform stripping of the lateral portions of the leaf from the stem, I prefer to provide some form of knife or cutter for the purpose of weakening, cutting, or severing the laterally-extending fibers of the leaf when the stemming action is commenced at the butt or larger end of the stem. Owing to the inclination of these fibers toward the point of the leaf and the natural toughness of the fibers it is necessary to weaken or partially or wholly sever them in order to remove them from the stem with the lateral portions of the leaf and to prevent the leaf from being stripped from the said fibers, which is not desired in the tobacco manufactories.

In carrying out my invention in its simplest form I take a leaf of tobacco, and seizing it with the fingers or by means of a suitable device, preferably at the tip, I present it to the action of a current of air produced by a powerful blast, which tears the lateral portions of the leaf from the central stem. During the operation the entire length of the leaf is subjected progressively to the action of the blast from the point of the leaf toward the butt, which is conveniently accomplished by moving the stem across the path of the blast.

In Fig. 6 I have illustrated a simple mechanism for carrying my invention into effect. In this figure, A represents a tube which is connected with an air-forcing device, in this instance a fan or blower. The tube A is preferably provided with two nozzles *a a*, arranged at an angle to each other, as shown, so as to discharge a strong blast of air on the leaf on opposite sides of its stem, and thereby rip or tear the lateral portions of the leaf from the stem. Before being subjected to the action of the blast the leaf is "cased" or moistened, so as to make it flexible, and it has been found by practical experiment that when in proper "case" the lateral portions of the leaf will tear away from the stem in straight lines close to and along the sides of the stem and will also tear from the stem and carry with them the laterally-growing fibers of the leaf when the leaf is presented to the blast point first.

I prefer to locate in the path of the blast discharged from the nozzles *a a* a receiving or guiding tube or casing C, as shown in Fig. 6, through which the air-current passes, carrying with it the severed portions of the leaf and leaving the denuded stem in the hand of the operator.

In Figs. 1 to 5, inclusive, I have illustrated a form of apparatus for carrying out my said invention in which the leaf is presented to the action of the air-blast from the butt first, in which case, as before stated, I advantageously employ a device for weakening or cutting the lateral fibers, so that they will come away with the lateral portions of the leaf, as owing to the manner in which these fibers grow they will not tear from the stem with the leaf when the stemming action begins at the butt of the stem. In these figures D represents a table or bed supported by suitable legs $d\ d$ and provided with an aperture therethrough, in which is mounted a tube E, preferably located in an inclined or nearly vertical position. In the upper or inlet end $e$ of the tube is located a rotary cutter or knife F, which I have found advantageous for weakening or cutting the fibers. This knife is provided with a series of oppositely-inclined cutting edges $f f$, which slope toward each other, forming a V-shaped cutting device. The edges $f f$ are shown in the drawings as being in line with each other; but this is not essential. In this apparatus I employ a mechanical feeding device consisting of two belts G G, preferably of leather, (although they may be of any other suitable material,) having a portion of one belt lying parallel to and closely adjacent to a portion of the other belt, so as to be capable of gripping the butt of the stem between them. These belts are mounted each on the large grooved rollers H H', and the parallel adjacent portions of the belts are held closely together by lateral guides extending substantially the entire length of said parallel adjacent portions and consisting in this instance of a series of stationary guide-rollers $h\ h$, arranged on one side of the travel of the belts and engaging one belt, and an opposite series of laterally-movable rollers $h'\ h'$, arranged on the opposite side of the travel of the belts and engaging the other belt. These guide-rollers are preferably grooved, and the movable rollers are pressed toward the stationary rollers by springs. In this instance each roller $h'$ is shown as mounted on a horizontal slide $h^2$, held in a guide $h^3$ and provided with a spring $h^4$. The forward end rollers H H are preferably mounted on a plate $H^2$, which is adjustable longitudinally of the machine by means of set-screws $h^5\ h^5$ to tighten the belts, and the plate $H^2$ may be clamped in its adjusted position by bolts or screws $h^6\ h^6$, passing through slots therein. Motion is imparted to the belts in any suitable manner, so as to cause the contiguous parallel parts thereof to travel in the same direction and at the same rate of speed. In the present instance the rollers H' H' are provided with intermeshing gear-wheels I I, to which motion is supplied from a driving-shaft I', provided with a pulley $I^2$, said shaft being provided with a bevel-pinion $i$, gearing with a similar pinion $i'$ and a vertical shaft $I^3$, carrying a pinion $i^2$, meshing with an idle pinion $I^4$, engaging one of the gear-wheels I.

A' represents the air-pipe, connected with an air-forcing device B' and provided with nozzles $a'\ a'$, which direct the blasts into the tube E immediately in front of the center of the knife F and below the belts G G, the ends of the nozzles being separated far enough to permit the butts of the stems to pass between them.

Below the table D, I prefer to provide an endless carrier L, having sides $l\ l$ and mounted on rollers $l'\ l'$ to carry off the flexible portions of the leaves after they leave the tube E. One of the rollers $l'$ is provided with a driving-pulley $l^2$, which receives motion from some suitable revolving part. In this instance I have shown the blower B' provided with a driving-pulley $b$ and a pulley $b'$, which by means of a belt engaging it and the pulley $l^2$ drives the carrier L. The shaft of roller $l'$ is provided with a pulley $l^3$, connected by a belt $f'$ with a pulley $f^2$ on the shaft $f^3$ of the rotary knife, and the shaft of said roller $l'$ is also shown as provided on the opposite side of the machine with a pulley $l^4$, connected by a belt $l^5$ with the pulley $I^2$ of the driving mechanism for the feed-belts.

I also indicate in Figs. 1 and 2 a carrier M, passing over a roller $m$ (the other roller not being shown) for carrying off the cleaned stems.

In operation the leaves are fed into the machine by placing the end of the butt in between the rollers H H, when belts G G will seize it and carry it under the blast-nozzles $a'\ a'$ and across the knife F. As the successive portions of the leaf pass beneath the blast-nozzles and across the knife the lateral portions are ripped from the stem, and the knife assists the blasts by cutting or weakening the lateral fibers of the leaves. The lateral portions of the leaves pass down through the tube E upon the carrier L, and the stems are carried on by the belts G G and dropped upon the carrier M, by which they are carried to any suitable point.

I do not limit myself to the exact details of construction herein shown and described, as the same may be varied without departing from the essence of my invention.

The novel process of stemming tobacco and other leaves herein disclosed is not claimed herein, as it forms the subject-matter of my former application filed January 17, 1900, and given Serial No. 1,779, of which this application is a division.

What I claim, and desire to secure by Letters Patent, is—

1. In apparatus for separating the lateral portions of leaves from their stems, the combination with a device provided with an aperture for the discharge of the separated portions of the leaves, of a blast-nozzle arranged adjacent thereto and means for supplying air under pressure to said nozzle, substantially as described.

2. In apparatus for separating the lateral portions of leaves from their stems, the combination with a tube for receiving and discharging the separated portions of the leaves, of an air-blast nozzle arranged adjacent to the end of said tube and an air-forcing device connected with said nozzle, substantially as described.

3. In apparatus for separating the lateral portions of leaves from their stems, the combination with a device provided with an aperture for receiving and discharging the separated portions of the leaves, of a plurality of blast-nozzles located adjacent to said aperture and arranged to direct blasts of air on opposite sides of the stems, and an air-forcing device connected with said blast-nozzles, substantially as described.

4. In apparatus for separating the lateral portions of leaves from their stems, the combination with means for holding the stem, of a blast-nozzle and means for supplying air under pressure to said nozzle, substantially as described.

5. In apparatus for separating the lateral portions of leaves from their stems, the combination with a device for holding the stem and feeding it forward, of a blast-nozzle and an air-forcing device connected therewith, substantially as described.

6. In apparatus for separating the lateral portions of leaves from their stems, the combination with a device for holding the stem and feeding it forward, of a blast-nozzle means for supplying air under pressure to said nozzle, and mechanism for weakening the lateral fibers of the leaf, located adjacent to the path of the blast, substantially as described.

7. In apparatus for separating the lateral portions of leaves from their stems, the combination with a device for holding the stem and feeding it forward, of two blast-nozzles, arranged to direct their blasts on opposite sides of the stem, an air-forcing device connected with said nozzles, and mechanism for weakening the lateral fibers of the leaf, located adjacent to the delivery ends of said nozzles, substantially as described.

8. In apparatus for separating the lateral portions of leaves from their stems, the combination with a rotary knife a blast-nozzle having its delivery end located adjacent to said knife and means for supplying air under pressure to said nozzle, substantially as described.

9. In apparatus for separating the lateral portions of leaves from their stems, the combination with a rotary knife a blast-nozzle having its delivery end located adjacent to said knife, an air-forcing device connected with said nozzle, and a carrier adapted to engage the stem, having its line of travel adjacent to said knife and the discharge end of said nozzle, substantially as described.

In testimony whereof I affix my signature in the presence of two witnesses.

LOUIS P. WHITAKER.

Witnesses:
J. K. MOORE,
B. W. BROCKETT.